O. N. CHASE.
Potato-Digger.
No. 41,424.  Patented Feb. 2, 1864.
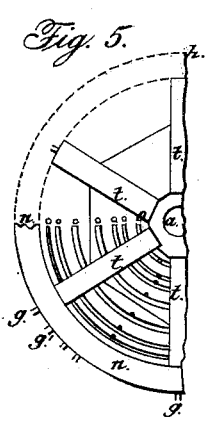
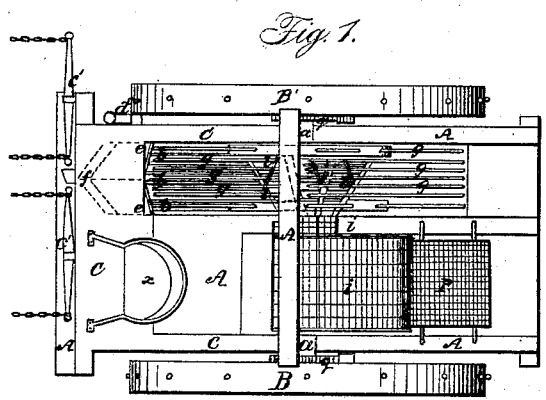
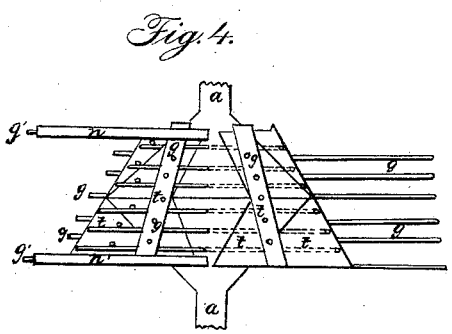
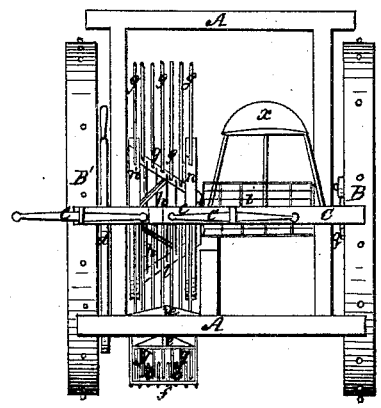
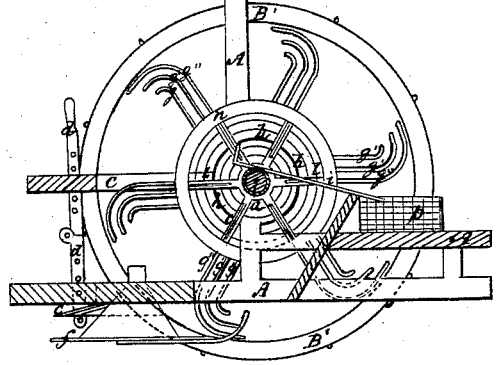
Witnesses:
Jno. W. Richardson
Munro Stevens
Inventor:
Otis N Chase

UNITED STATES PATENT OFFICE.

OTIS N. CHASE, OF BOSTON, MASSACHUSETTS.

IMPROVEMENT IN POTATO-DIGGERS.

Specification forming part of Letters Patent No. 41,424, dated February 2, 1864; antedated January 27, 1864.

*To all whom it may concern:*

Be it known that I, OTIS N. CHASE, of Boston, in the county of Suffolk and State of Massachusetts, have invented a new and Improved Machine for Harvesting Potatoes and other Vegetables; and I do declare that the following is a full and exact description thereof, reference being had to the accompanying drawings, (letters of reference being thereon,) of which drawings—

Figure 1 is a top view; Fig. 2, a front elevation, and Fig. 3 a longitudinal section. Figs. 4 and 5 are detached views of the hub and conical screen at $h$, Fig. 4 being a top view, Fig. 5, a side view, of one-half the same.

To enable others skilled in the art to make and use my invention, I will proceed to describe a machine made in accordance therewith and its construction and operation.

The wheels B B' and axle $a$ are connected by the ratchet-wheels and pawls $q\,q$, so that they rotate together forward but independently backward.

Connected with the axle $a$, and supported by it at one end, is the frame C, upon which is the driver's seat $x$. The other end may be supported by the horses that draw the harvester, or otherwise. Supported upon said axle $a$ is the frame A, which turns freely upon said axle, which serves as a support for the diggers $e$ and $f$, and which is connected with the frame C at its front end by the toggle-lever $d$, the purpose of said lever $d$, or its equivalent, being to enable the driver to elevate and depress at pleasure the diggers $e$ and $f$, so as to cut a proper strip of earth. The frame A may be elevated and depressed in different ways, yet such ways must agree in this, that the diggers $e$ and $f$ may be elevated or depressed thereby, substantially as described.

Attached to the front end of the frame A are the diggers $e$ and $f$, the upper digger, $e$, of which is so formed as to cut or turn aside weeds and potato-tops and to remove some top earth, while the lower digger, $f$, is so formed as to cut below and on the sides of the potato-row, so that as the machine progresses along the row the digger $f$ will cut a strip of earth containing the potatoes. The digger $f$ has at its rear end a screen, $b$, and such digger is so arranged that a strip of earth cut as aforesaid will be forced by the forward motion of said harvester between the sides of said digger $f$ upon said screen $b$. Said screen $b$ is composed of parallel bars of suitable material open at the rear end, and so near each other as to retain potatoes above such bars, yet allow earth to fall between.

Attached to the axle $a$, and rotating with it, are the pickers $g\,g$ and the conical screen and surfaces at $h$. The pickers $g\,g$ are composed of parallel bars of proper shape, so arranged that when the axle $a$ rotates the bars of the pickers $g\,g$ pass between the bars of the screen $b$, and will take therefrom whatever remains upon said screen $b$. The bars of said pickers $g\,g$ are so bent and arranged as to retain whatever may be so taken up until carried above said conical screen, when the potatoes and earth remaining thereon will roll or slide along the bars of said pickers $g\,g$ upon said conical screen, hereinafter more fully described.

Connected with the axle $a$, and of slightly greater width than the pickers $g\,g$, is the conical screen and hub at $h$. This hub is nearly of the shape of two similar and equal frustums of a cone with their larger bases in contact and their axes in the same line. The hub is affixed to the axle $a$, the axes of both coinciding. Projecting from said hub, and diverging from the axis $a$ as a center, are the flanges $t\,t$, (see Figs. 4 and 5,) which serve as a support for the bars of the pickers $g\,g$, and also as a support for the curved bars or rings $o\,o$ of said conical screen, and as a guide both to the potatoes above said conical screen and to earth upon said hub. Inserted into or passing through said flanges $t\,t$ are the bars or rings $o\,o$, which form the said conical screen. The distance between said curved bars or rings is such as to allow earth shaken from said potatoes to escape between said bars or rings, while the potatoes cannot pass.

Toward one side of the screen the rings or curved bars are of less diameter, so that the outer surface of said conical screen much resembles the curved surface of a frustum of a cone. The bars of the pickers $g\,g$ project from said flanges $t\,t$, dividing the outer surface thereof into compartments. A space is left between said conical screen and said hub sufficient to allow the escape of earth, as hereinafter described. Near the sides of the pickers $g\,g$, over the edge of said conical sieve, are the rings $n\ n'$, which serve to support bars $g'\ g'$, which prevent potatoes from escaping at the sides of the pickers. One of them, $n'$, also prevents potatoes from escaping at the larger side of the conical sieve. The conical screen-hub and flanges $t\ t$ are so arranged that the earth shaken from the potatoes will pass between the bars or rings of said conical screen upon said hub, between two of said flanges, will thence slide down said conical hub and between said flanges $t\ t$, one side of said pickers $g\ g$, thence to the ground, while the potatoes falling upon said conical screen will slide toward its apex upon the inclined screen $i$, near the small end or side of said conical screen. This inclined screen $i$ is so arranged that the potatoes will slide or roll down thereon into the receptacle at P, while the earth escapes between the bars of said screen upon the ground. The receptacle at P is attended by a person upon the frame A.

The operation of the machine is as follows: The front end of the frame C is properly supported by horses or otherwise. Horses or other power being attached, the driver seats himself, and by the lever $d$ lifts the diggers $e$ and $f$ from the ground and drives to the potato-row. He then depresses the diggers by said lever $d$, so that the upper digger, $e$, will cut or turn aside the tops and weeds, while the lower digger, $f$, will cut a strip of earth containing the potatoes. The progress of the harvester will force this strip upon the screen $b$. A part of the earth will fall through said screen. What remains will be taken up by the rotating pickers $g\ g$, will be carried above the conical screen, and then slide upon the said screen. Whatever passes through said conical screen is guided aside by the hub and flanges $t\ t$, and thence falls to the ground. Whatever does not pass through slides down said screen upon the inclined screen $i$. The potatoes are again screened thereon as they roll or slide down said inclined screen $i$ into the receptacle at P. As soon as one of these receptacles is full another is supplied by the attendant.

The pickers $g\ g$, the conical screen, and hub at $h$ may be used alone where it is desirable to separate lumps of different sizes, also for gathering vegetables. The diggers $e$ and $f$ may be one solid piece, if desirable. The hub at $h$ may consist of but one conical surface, instead of a double one described.

The toggle-lever $d$ consists of two pieces connected by a joint, with holes for graduation above and below the toggle-joint at the points respectively where the lever touches the frames A and C. By means of this toggle-lever $d$, I effect the important object of elevating and depressing the diggers $e$ and $f$ with great rapidity, and also keep them in the desired position by other means than their own weight.

The pickers $g\ g$ may be supported upon a series of shafts, the ends of said shafts to be inserted in the rings $n\ n$. By this means the pickers $g\ g$ may be made adjustable upon the conical hub, or they may be otherwise supported upon said hub. The conical hub, screen, and pickers $g\ g$ may be used with the diggers $e$ and $f$, separately, if desirable.

Suitable gearing may be attached to the axle $a$ and connected with the conical hub for the purpose of reversing the motion of the hub and pickers $g\ g$. By this means the vegetables gathered by the pickers $g\ g$ would not be so likely to be damaged by said pickers. Instead of the inclined screen $i$, as shown, there may be a screen similarly constructed to the screen $b$, placed either in front or rear of the conical hub, for the purpose of taking vegetables from the pickers $g\ g$. In this case it is not necessary that the screen at $h$ should be conical. By these means two rows of potatoes may be gathered at the same time upon the same frames A and C, when a similar apparatus is attached to the other side of the machine at the same distance from this that the rows are apart.

What I claim herein as of my own invention is—

1. The diggers $e$ and $f$, constructed and operating substantially as described, when combined with the frames A and C and toggle-lever $d$, for the purposes set forth.

2. The frames A and C, with the toggle-lever $d$, constructed and operating substantially as described.

3. The combination of the pickers $g\ g$ with the conical screen and hub, substantially as described, for the purposes set forth.

4. The combination of the pickers $g\ g$, conical hub, and screen (conical or otherwise) with the inclined screen $i$, all substantially as described.

OTIS N. CHASE.

Witnesses:
IVORY W. RICHARDSON,
MUNROE STEVENS.